Figure 1:
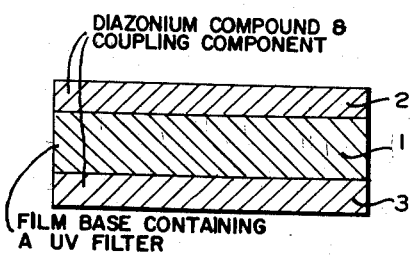

Dec. 18, 1962 C. E. HERRICK, JR 3,069,268
METHOD FOR IMPROVING THE TONAL GRADATION OF DIAZOTYPE
MATERIALS USING STRATIFIED SENSITIZING
COMPONENTS AND U.V. FILTERS
Filed July 10, 1958 6 Sheets-Sheet 1

INVENTOR
CLIFFORD E. HERRICK, JR

BY

ATTORNEYS

United States Patent Office 3,069,268
Patented Dec. 18, 1962

3,069,268
METHOD FOR IMPROVING THE TONAL GRADATION OF DIAZOTYPE MATERIALS USING STRATIFIED SENSITIZING COMPONENTS AND U. V. FILTERS
Clifford E. Herrick, Jr., Chenango Forks, N.Y., assignor to General Aniline & Film Corporation, New York, N.Y., a corporation of Delaware
Filed July 10, 1958, Ser. No. 747,691
9 Claims. (Cl. 96—68)

The present invention relates to a method of improving the tonal gradation of light-sensitive diazotype materials and more particularly to light-sensitive diazotype materials capable of yielding continuous tone images and comprising stratified layers of light-sensitive diazos and coupling components correlated with U.V. filters.

It is generally accepted that diazotype materials produce copies of high contrast. Indeed, it is because of this unique property that the diazotype process has gained such a wide spread use in reproducing engineering drawings and letters and other documents printed or drawn on translucent base material. The diazotype copies can be made in many colors, in the presence of room light, and the process produces dry copies in a matter of seconds. For these reasons of convenience and flexibility, the diazotype process is attractive for replacing silver halide photographic methods in some applications. However, the high contrast properties of diazotype materials render the process generally somewhat unsuited for the copying of continuous tone originals such as silver film positives, unless the silver originals have been especially prepared so that they compensate for the contrasty toe sensitometric characteristic of the diazotype copying material.

A number of attempts have been made to improve the tonal gradation of diazotype materials. A typical diazotype sensitomeric curve (shown in FIG. VIII, hereinafter more fully defined) consists in a rounder high density portion of low contrast; as the density of the layer is lowered by exposure, the contrast increases continuously and reaches a moderately high value in the low density region. Thereafter, the contrast diminishes with exposure. Under ordinary circumstances, no portion of the sensitometric curve is linear to a sufficient degree to be useful for continuous tone work. The behavior described, however, is nearly ideal for reproduction of line copy.

In one of the schemes for producing a more nearly linear sensitometric curve (British Patent 726,755) two or more diazos of different light absorbtivity are coated in a diazotype formulation. The more light-sensitive member of the pair is more rapidly destroyed so that the high density contrast is increased. The slower member of the pair tends to remain undestroyed at longer exposures and thus contributes towards producing a lower highlight contrast.

This scheme suffers from several fundamental disadvantages. Thus, any pair of diazos which are sufficiently different in their chemical constitution to have widely different light sensitivities so that substantive sensitometric effects are produced are also most likely to produce dyes of widely different colors and also to couple to produce such dyes at widely different rates. These effects, especially in combination, tend to produce a two-tone effect such as that described in U.S. Patents 2,542,715 and 2,542,716, e.g., a different dye color is produced at high density and at low density. A further disadvantage lies in the fact that printing speed is adversely affected by the presence of the slower printing diazo. Consequently, only rather modest gains can be made using this process.

Still another approach is disclosed in U.S. Patent 2,114,468 where it is stated that lowering the actinic density of the diazo compounds in a diazotype layer during exposure will cause the layer to exhibit a softer gradation. While substantial changes especially in the highlight region can be brought about by such means, the price to be paid in exposure time is large indeed. Thus, a significant lowering in tone contrast would require in the neighborhood of a tenfold increase in exposure time over that normally experienced. In addition, the mercury arc commonly used for exposing diazotype materials does not emit large amounts of radiation in a spectral region where it would cause photodecomposition and still be weakly absorbed. No practical use has been made of this method.

Still another way of bringing about a continuous tone effect in the diazotype material is described in U.S. Patent 2,603,564 which involves admixing finely divided pigments such as barium sulfate, calcium sulfate and the like, into the formulation used in sensitizing. While it is true that some improvement in continuous tone is brought about by this method, it must be stated that an appreciable part of the gain comes about through a simple reduction in the dye density of the layer, due to the whitening effect of the pigment. Indeed, the whitening effect tends to produce a chalky appearance in the print. This method, likewise, has found no practical use.

Still another method is described in PB 25 781, pages 870, 853, 843, and 829, whereby a yellow dye is introduced into the diazo layer thereby bringing about an overall softening of the diazotype sensitometric curve. As noted in the PB references cited, this scheme suffers from a fundamental disadvantage in that considerable amounts of yellow die are required in order to gain the desired softening. The quantity of dye required reduces printing speed and, more seriously, causes a degradation of visual contrast due to the background of yellow dye. Efforts are reported in which a dye was used which bleached in the presence of ammonia, but the bleaching effect appeared to be only temporarily and the yellow color returned on aging.

Finally, the most severe disadvantage of such yellow filter systems is the fact that the yellow dye depresses contrast not only in the highlight region where such depression is desirable, but also causes a progressive lowering of contrast in the shadow region of the sensitometric curve, where the contrast is already much too low.

It is the object of this invention to produce a diazotype material having only a slight coloration (buff), said material possessing good continuous tone properties (where the image is not composed of dots) and to accomplish this with conventional and time tested diazotype components free from two-toning tendencies while accepting only modest losses in printing speed, sacrificing no maximum density and maintaining undiminished shadow contrast.

This result is procured by the use of a light-sensitive diazotype material comprising a translucent or opaque base bearing stratified light-sensitive layers, one being an upper layer sensitized with a light-sensitive diazo and coupler and the other a lower layer sensitized with the same or similar light-sensitive components, the printing light being subjected to the action of a U.V. absorber after passing the upper light-sensitive layer and before or during its action on the lower light-sensitive layer. The upper light-sensitive layer, i.e., that which is first struck by the printing light, receives the shadow detail of the continuous tone image to be printed and the lower sensitive layer receives the highlights of such images. Any stratified arrangement of layers, meeting these prerequisites, is suitable for my purpose.

Figure 5:
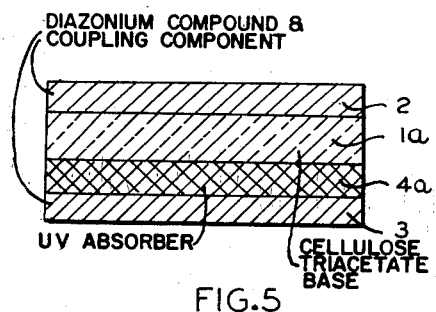
Figure 2:
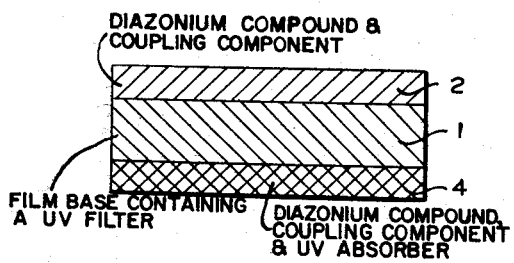
Figure 7:
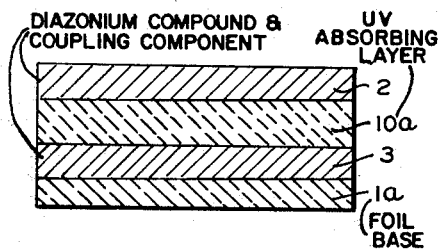
Figure 3:
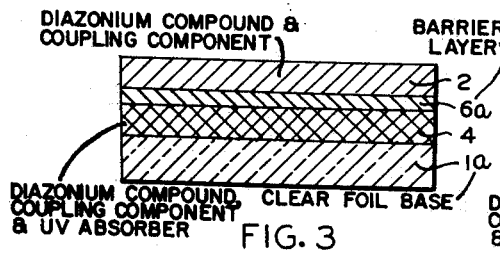
Figure 6:
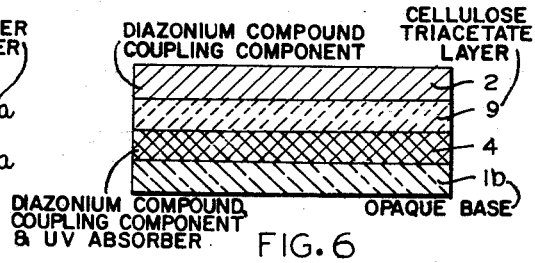
Figure 4:
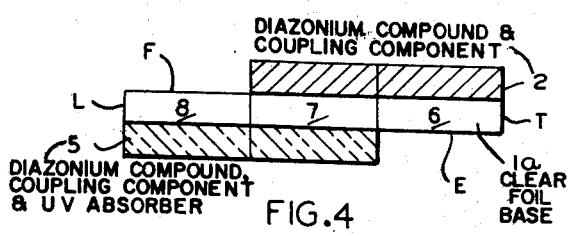
Figure 11:
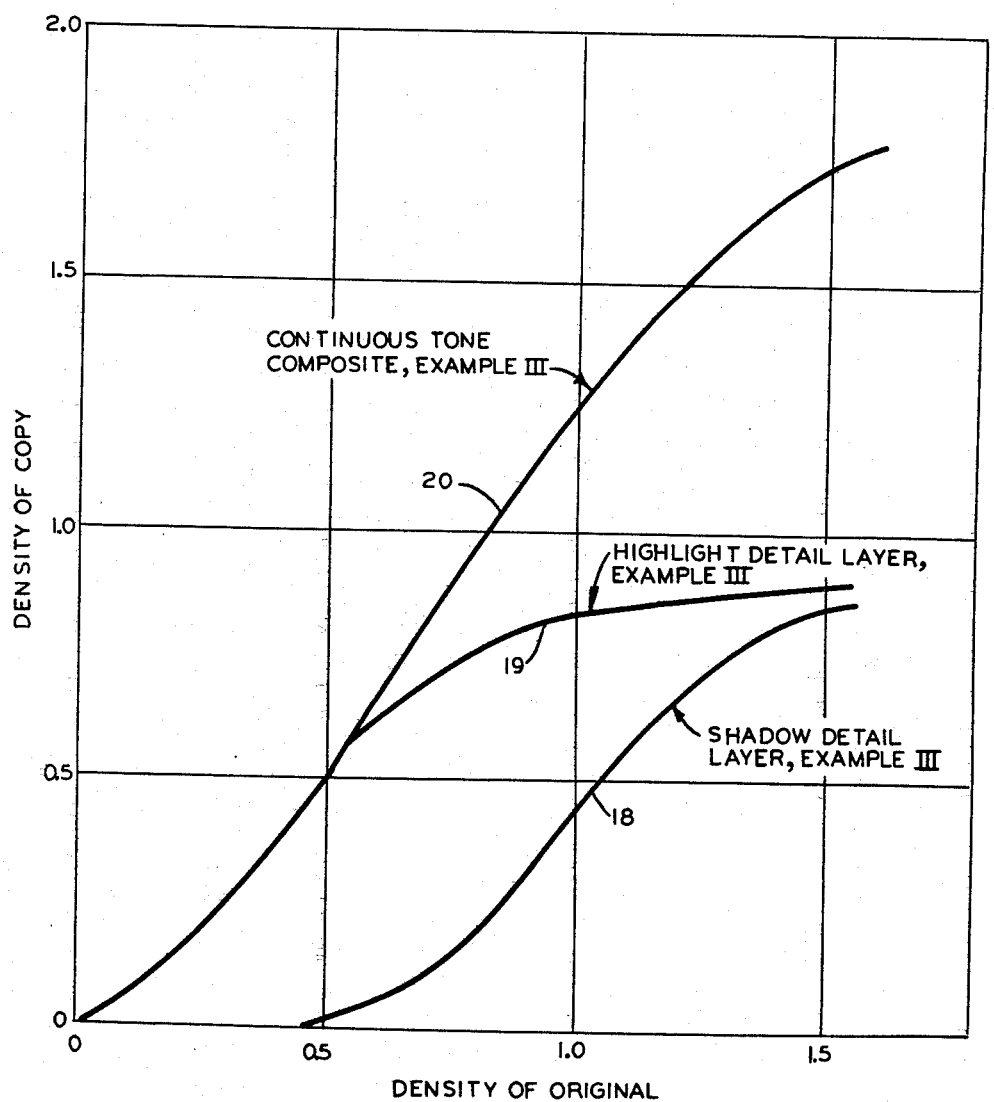
Figure 10:
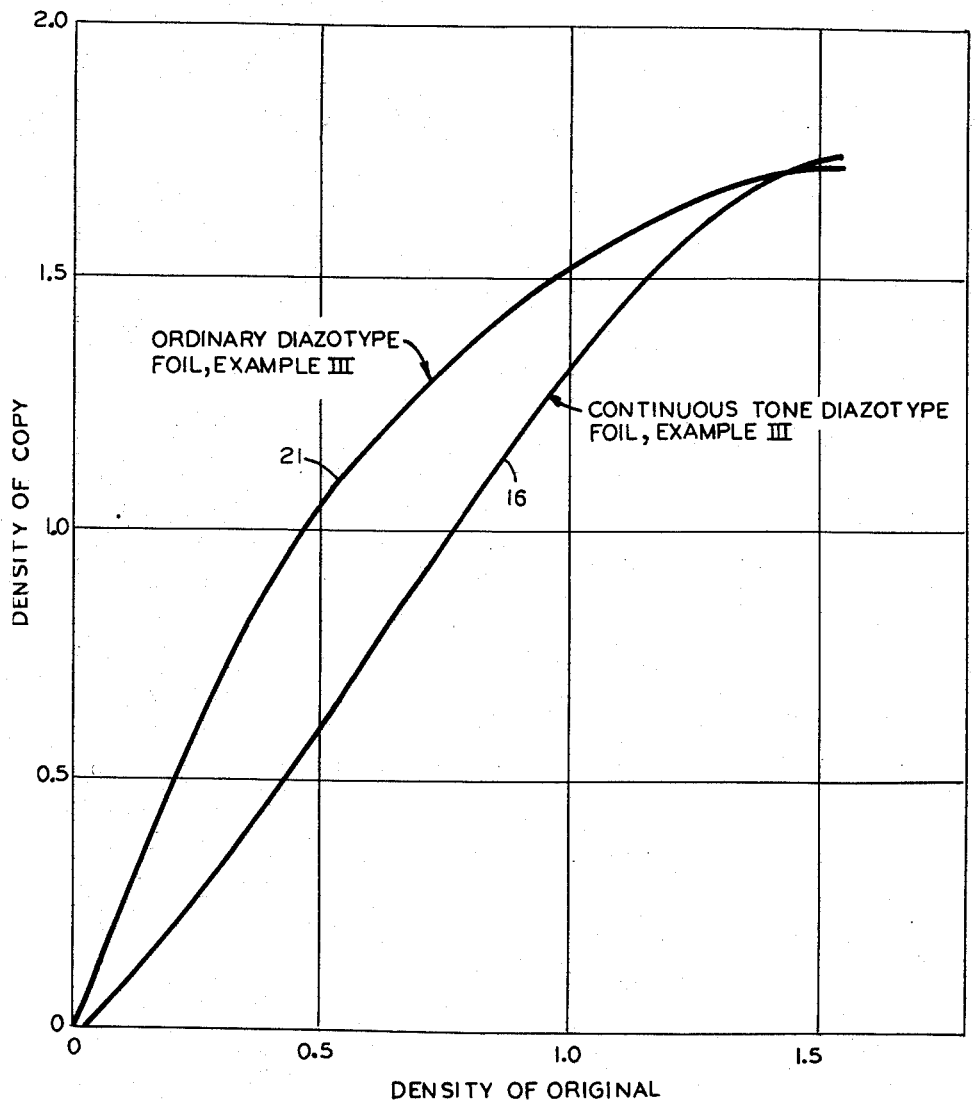
Figure 12:
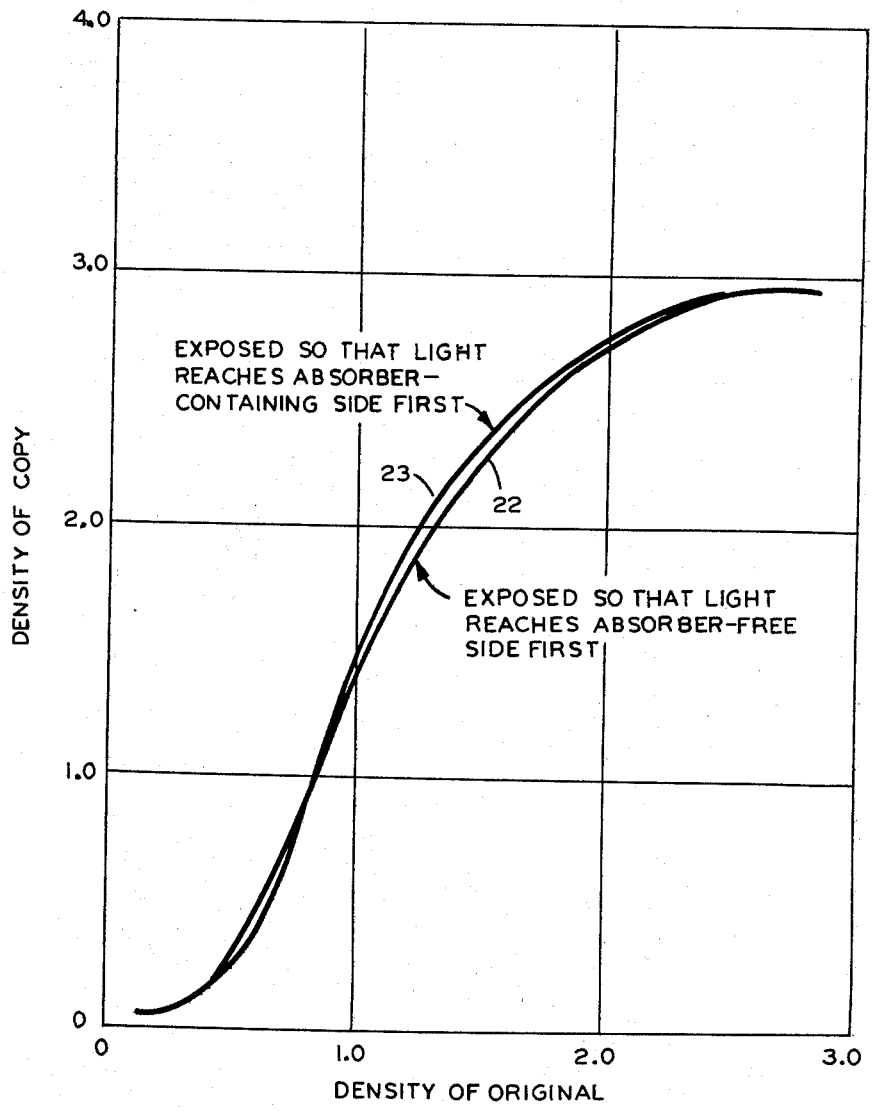
Figure 9:
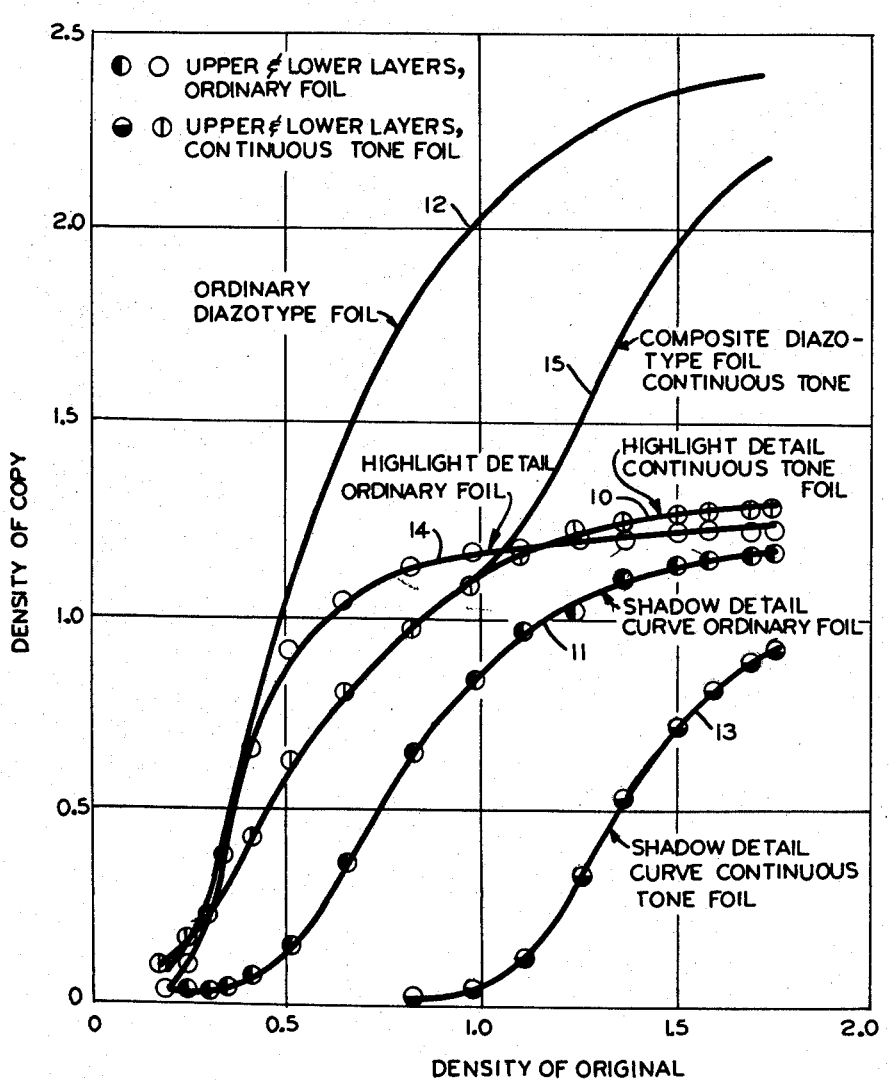
Figure 8:
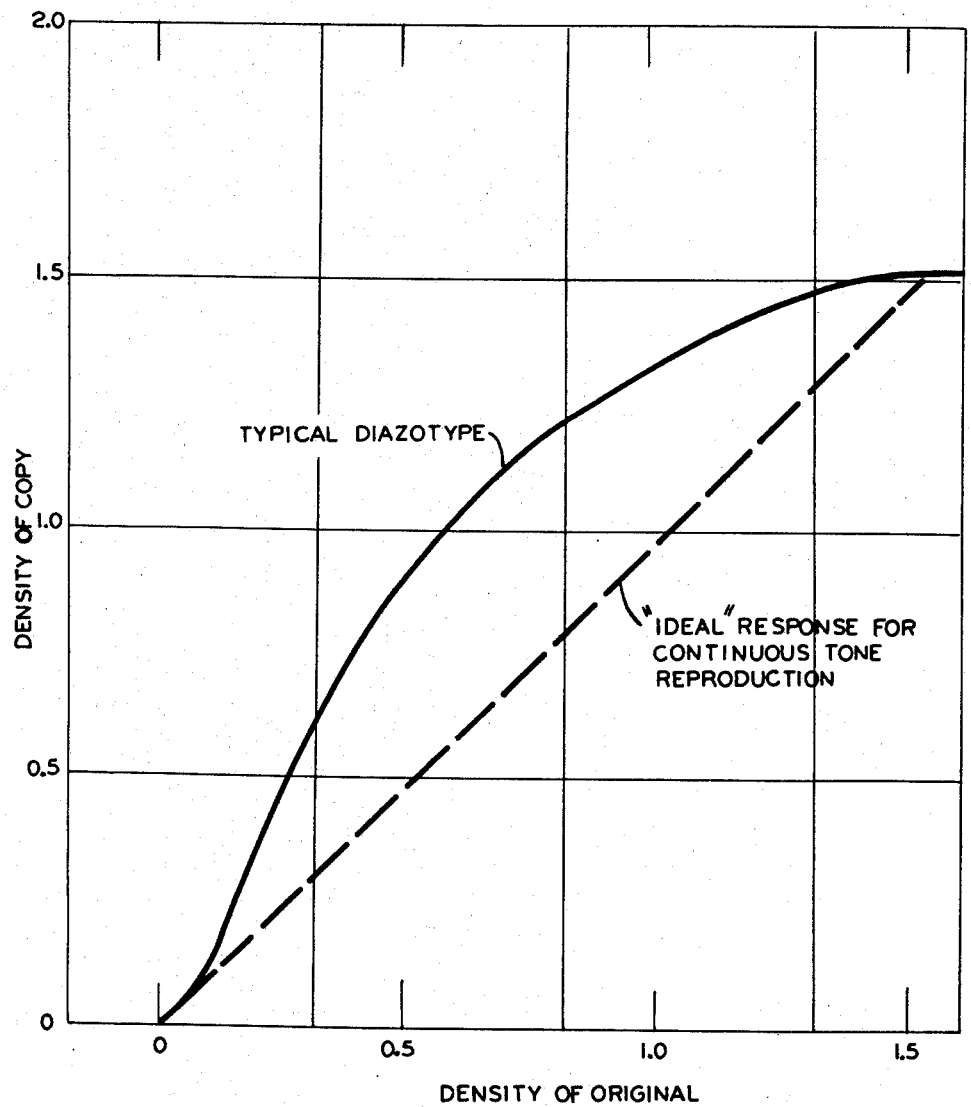

My invention will be further described by referring to the accompanying drawings in which FIG. 1 shows, in section, one modification of a stratified light-sensitive diazotype material according to the invention; FIG. 2 and FIG. 3 disclosed, in section, alternate modifications of said light-sensitive diazotype material; FIG. 4 shows, in section, the diazotype material of Example III; FIG. 5 shows, in section, the diazotype material of Example IV; FIG. 6 shows, in section, the diazotype material of Example V; FIG. 7 shows, in section, the diazotype material of Example VII; FIG. 8 shows a sensitometric curve for a conventional diazotype material and an ideal response curve for a continuous tone reproduction, the curves being obtained by printing the density of the copy as ordinates and the density of the original as abscissae; FIG. 9 shows the sensitometric curve obtained as described in Example I, while printing as before, the density of the copy against the density of the original; FIGS. 10 and 11 show the sensitometric curves obtained as described in Example III while printing the density of the copy against the density of the original and FIG. 12 shows the sensitometric curves described in Example VI and obtained by printing the density of the copy against the density of the original.

In FIG. 1, 1 is a translucent or transparent base of a suitable foil material such as cellulose acetate, a polyester such as polyethylene terephthalate, polystyrene or the like into which has been absorbed a U.V. filter dye having a strong absorption in the near U.V., e.g., in the 3660 A. region of the mercury arc and a modest absorption in the extreme visible violet region, e.g., around 4046 A. The base is overcoated with a light-sensitive layer 2 of a diazo from a phenylenediamine and a coupling component and is undercoated with the same or a similar light-sensitive layer 3.

FIG. 2 shows a structure similar to that of FIG. 1 excepting that the layer 4 (the undercoat) contains not only the sensitizing composition of layer 3 but, in addition, the U.V. absorber of layer 1.

FIG. 3 depicts a diazotype material comprising a clear foil base 1a coated with a layer 4 of a sensitizing composition as aforesaid and containing a U.V. absorber. Layer 4 is overcoated with a very thin clear barrier layer 6a such as gelatin, collodion, cellulose triacetate or the like and the barrier layer, in turn, is overcoated with a sensitizing layer 2 like that of FIG. 1.

FIG. 4 shows a structure more completely described in connection wtih Example III in which a clear foil base 1a is partially coated on one side with a layer 2 of a sensitizing composition as aforesaid and partially on the other side with layer 5 of such a sensitizing composition containing a U.V. absorber. Three sections, 6, 7 and 8, are thus produced: section 6 comprising the base only overcoated with layer 2; section 7 comprising the base overcoated with layer 2 and undercoated with layer 5 and section 8 comprising the base only undercoated with layer 5.

FIG. 5 shows a diazotype material in which a cellulose triacetate base 1a is coated on the back side with a U.V. absorbing layer 4a which, in turn, is coated with a sensitive diazo layer 3. The opposite side of base 1a is coated with the same sensitive diazo layer 2.

FIG. 6 discloses an opaque base 1b which is coated with a layer 4 of a light-sensitive diazo composition containing a U.V. absorber. Layer 4 is coated, in turn, with a cellulose triacetate layer 9 which is overcoated with a light-sensitive diazo layer 2.

In FIG. 7, 1a represents a foil base coated with a light-sensitive diazo layer 3, the latter being overcoated with a U.V. absorbing layer 10a which is, in turn, coated with a light-sensitive diazo layer 2.

It is well known that diazo compounds, especially those of the phenylenediamine type, either ortho- or para-, very strongly absorb over a substantial range of the total actinic light from, for instance, the mercury arc. Due to this strong absorption, a very thin layer of diazo compound lying nearest to the light source thus tends to protect the underlying diazo from photodecomposition. On photodecomposition, the diazo is changed into a species which absorbs the actinic light very poorly, e.g., the diazo compound "bleaches" and by virtue of bleaching, allows the actinic light to pass to the next underlying layer, and so on. The phenomenon described is known as the Aufroll effect; (ref. 1, J. M. Eder, Z. Wiss Phot., 33, 1–12 (1934)). The phenomena of actinic absorption and bleaching give rise to the characteristic sensitometric behavior of diazo compounds, (ref. 2, C. E. Herrick, Jr., Jour. Op. Soc. America, 42, 904–910 (1952)).

It can be seen from the foregoing that the density differences giving rise to shadow details tend to be recorded in the portion of the diazo layer nearest the light while the highlight details tend to be recorded in the portion of the layer lying furthest from the light. Under ordinary circumstances, it is impossible, with normal continuous tone positives, to burn down sufficiently far on the sensitometric curve of FIG. 8 so that the shadow details are recorded in a portion of the curve having adequate contrast, without, at the same time, losing (effectively by over-exposure) detail in the highlights.

In my invention, advantage is taken of the fact that shadow and highlight detail are recorded in separate portions of the light-sensitive material or can be caused to be so recorded. Thus, as the drawings show, I interpose between the shadow recording and highlight recording portions of the material a substantially colorless filtering layer, which acts to hold back the amount of light reaching the highlight regions. Consequently, sufficient exposure can be given to produce good shadow contrast without sacrificing highlight detail. It is to be noted that the detailed shape of the altered sensitometric curve which I obtain is determined by many factors which include:

(1) The relative proportions of diazo above and below the filter layer
(2) The spectral energy distribution of the light source
(3) The spectral absorption of the filter chemical
(4) The spectral absorption of the diazo(s)
(5) The spectral variation, if any, of the quantum efficiency of diazo decomposition
(6) The overall dye density of the layer.

For instance, with monochromatic light, and no intermingling between filtering and diazo layers, a marked and characteristic flattening of the sensitometric curve is observed at the exposure corresponding to that at which the light has burned through to the filter. On the other hand, if polychromatic light is used for exposure, and if the filter compound absorbs more strongly in one actinic region than in another, the flattening is much less noticeable. Finally, if polychromatic light is used with a filter compound of the above characteristics and a degree of intermingling between the second and third layers obtained, the flattening is still less.

It should be apparent that the relative maximum density of the highlight recording and shadow recording layers is important and I have found that for best results from a normal positive the maximum density of the highlight recording layer should be somewhat greater than that of the shadow recording layer. However, the method allows a considerable degree of sensitometric flexibility in dealing with "soft" or "hard" originals and in general for special effects.

It is to be emphasized that in my invention, shadow contrast is unimpaired since the concentration of the filter chemical present in the shadow recording layer is controlled. Due to the efficiency peculiar to the stratified arrangement and polychromatic light of suitable spectral energy distribution characteristics, sufficiently small amounts of the U.V. filter chemical can be used so as to be substantially invisible. The importance of the present invention is thus confined to the polychromatic case, with stratified layers.

The function of a composite like that of FIGS. 1 to 7 can be more precisely explained by the following simple experiment:

A continuous tone silver positive having a scale in the vicinity of say 1.7 density units is selected. A black developing diazotype foil, for instance, a foil produced with the sensitizing composition of Example I, and having a fully developed visual density of about 1.3 density units is uniformly pre-flashed to reduce its fully developed density to 1.0 density unit. Two such pre-flashed pieces of foil are overlaid and exposed simultaneously beneath the continuous tone silver original. It will be found that regardless of the exposure selected, no acceptable positive copy can be made. At those shorter exposures which yield fair highlight rendition, the shadow detail in the copy (which it will be noted is largely contained in the foil nearest the light source during exposure) will be badly blocked; on the other hand, longer exposures which yield shadow detail will entirely wash out the highlight detail (which highlight detail, it will be noted is contained largely in the foil furthest from the light source during exposure). By my procedure disclosed immediately below, however, both highlight and shadow detail can be retained.

I first make an exposure on a single sheet of the aforesaid foil, pre-flashed as above, and attempt to carry either good highlight or good shadow detail, but not both. Next, I make another exposure, longer or shorter than the foregoing, on another sheet of pre-flashed foil in which the detail missing in the sheet first exposed, e.g., highlight or shadow detail as the case may be, is correctly rendered. A complete diapositive having both good shadow and good highlight detail is obtained by overlaying the two separate sheets described just above.

This experiment, while aiding in explaining my basic concept, is of no great interest for the reason that it requires a multiplicity of exposures and I desire to accomplish the end result automatically with a single exposure.

Diazotype materials as shown in FIGS. 1 to 7 may readily be produced, for instance, by coating one side of a foil with a foil sensitizing formulation, and then, using a penetrating solvent, coating the reverse side of the foil with an actinic light absorber having the properties described. Finally, preferably using a somewhat less penetrating coating solvent, this latter side is sensitized with a diazotype formulation similar to that employed on the first side coated. When the diffusion coefficients of the light absorber and sensitizing chemicals are properly related relative to each other, the light absorber and sensitizing formulation may be combined and the coating on the reverse side done in one operation. Similarly, all of the coatings can be put on the same side of a transparent or opaque base. In the latter case, continuous tone paper can be coated.

My sensitizing compositions are compounded by utilizing as the light-sensitive diazo compound a diazo from a p- or o-phenylenediamine typical of those employed in light-sensitive diazo compositions. Examples of such diazos are those from the amines:

N-phenyl-p-phenylenediamine
N,N-diethyl-p-phenylenediamine
N-methyl-p-phenylenediamine
N,N-dimethyl-p-phenylenediamine
N-2-hydroxyethyl-p-phenylenediamine
N-ethyl-N-2-hydroxyethyl-p-phenylenediamine
N¹-ethyl-2-methyl-p-phenylenediamine
N¹-cyclohexyl-2-methoxy-p-phenylenediamine
p-Morpholinoaniline
p-Piperidinoaniline
2-chloro-4-piperidinoaniline
2-methoxy-4-morpholinoaniline
2-methyl-4-piperidinoaniline
N¹,N¹-diethyl-3-methyl-p-phenylenediamine
4'-amino-2',5'-diethoxybenzanilide
4'-amino-2',5'-dibenzyloxybenzanilide
4'-amino-2',5'-dibutoxy-acetaniline
N-(p-ethoxyphenyl)-p-phenylenediamine
N¹,N²-diethyl-3-ethoxy-p-phenylenediamine
N¹,N¹-diethyl-3-methyl-p-phenylenediamine
N¹-ethyl-2-methyl-p-phenylenediamine
5-methoxy-2-morpholinoaniline
N¹,N¹-dimethyl-4,5-dimethyl-phenylenediamine
4'-amino-5'-dimethylamino-2'-methylbenzanilide
N³,N³-dimethyl-2,3-dibenzofuranediamine of the following formula:

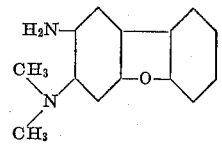

The diazonium compound is preferably employed in the form of its double salt complexes with zinc chloride, cadmium chloride, tin chloride, boron trifluoride or in the form of its sulfate.

The coupling components which I use in my compositions are of the type generally employed in the manufacture of light-sensitive diazotype layers. These couplers may be those containing a phenolic hydroxyl group or an active methylene group. Examples of such couplers are:

2,3-naphthalenediol
6,7-dihydroxynaphthalene-2-sulfonic acid
N-o-methoxyphenyl-3-hydroxy-2-napthamide
4,4'-diresorcinol
N-o-tolyl-3-hydroxy-2-napthamide
1-naphthol-3-sulfonamide
1-phenyl-3-methyl-5-pyrazolone
Acetoacetanilide
Acetoacet-o-toluidide, and the like.

The sensitizing composition, in addition to the diazonium compound and the azo coupling component, also contains the usual adjuncts designed to effect stabilization such as thiourea, thiosinamine, and the like and to retard the precoupling citric acid, sulfosalicylic acid, boric acid, tartaric acid and the like.

The components, prior to application, are dissolved in suitable solvents such as water, isopropyl alcohol, butyl alcohol, acetone, methanol, methoxymethanol, 2-methoxyethyl acetate and the like.

The carrier or base layer may be paper, a polyester such as aforesaid, a vinyl base such as polyvinyl acetate, polystyrene, cellulose triacetate and the like.

The U.V. absorbers must possess the absorption characteristics previously noted. It has been ascertained that these characteristics are shared by different types of U.V. absorbers, such as:

1,3-di-2-thienyl-2-propen-1-one
2-napthalenediazocarboxamide
4,4'-oxalyldiresorcinol A mixture of one part of butyl 3-umbelliferonecarboxylate and one part of 2,3-bis(3,4-methylenedioxyphenyl)-5-phenylpyrrole.

A mixture of four parts of butyl 3-umbelliferonecarboxylate and one part of 2-naphthalenediazocarboxamide.

2,2'-dihydroxy-4,4'-dimethoxy-benzophenone and mixtures thereof with 2,2',4'-trihydroxy-4-methoxy-benzophenone.

The invention is further illustrated by the following examples when read with the drawings, but it is to be understood that the invention is not restricted thereto.

EXAMPLE I 5 mil. thickness cellulose triacetate cast film base was coated on both sides by the dip bead method using a solution of the following composition and subsequently thoroughly dried.

80 cc. acetone
20 cc. 2-methoxyethanol
2.5 g. a mixture of 2,2'-dihydroxy-4,4'-dimethoxy benzophenone with 2,2',4'-trihydroxy-4-methoxy benzophenone The filter above is designated in this and the following examples as filter No. 5; similar filters were made by using 1.0 g. of the mixture (No. 4), 0.75 g. of the mixture (No. 3), 0.5 g. of the mixture (No. 2) and 0.38 g. of the mixture (No. 1). The resulting filters were very faintly buff in appearance.

Triacetate film base similar to that described above was coated at a speed of about 30 feet per minute using a 10 second inhibition time, excess solution being removed from the film surface by rubber bar doctoring, with a sensitizing solution of the following composition and thereafter dried.

37 cc. water
25 cc. isopropyl alcohol
10 cc. butyrolactone
10 cc. butyl alcohol
12 cc. 85% formic acid
5 g. sulfosalicylic acid
1.5 g. zinc chloride
8 g. resorcinol
0.35 g. 2,3-naphthalenediol
2.1 g. 6,7-dihydroxynapthalene-2-sulfonic acid
4.4 g. 4-diethylamino-2-ethoxybenzenediazonium chloride, zinc chloride double salt
0.9 g. 4-N - diethylamino - 2 - methylbenzenediazonium chloride, zinc chloride double salt Curl was neutralized on this foil by wetting the back of the film with a solution of the following composition and dried:

54 cc. water
29 cc. isopropyl alcohol
11 cc. formic acid

When ammonia developed, this formulation produces a black-developing foil. When exposed beneath a piece of clear triacetate foil on a white print diazotype machine, the sensitized foil produced clear exposed areas at a speed of 7.1 feet per minute. When exposed beneath any of the filters (Nos. 1, 2, 3, 4 or 5), it was found that the printing speed of the sensitized foil was reduced in each case but by different amounts. The ratio, $$\frac{\text{feet per minute printing speed beneath filter}}{\text{feet per minute printing speed beneath clear foil}}$$

is the effective transmission of the filter relative to the specified sensitized material employed in the effective transmission test. Using the black developing foil just described, the following values were found for the effective printing speed of the various filters.

*Effective Printing Speed for Light Absorbing Filters*

| Filter number: | Effective transmission, percent |
|---|---|
| 1 | 25 |
| 2 | 23 |
| 3 | 20 |
| 4 | 18 |
| 5 | 11 |

The following sensitometric experiments were now carried out:

(A) Two pieces of the black developing foil described above were overlaid and exposed simultaneously, as overlaid, beneath a calibrated silver wedge at 4 feet per minute in a white print ammonia developing machine having a printing and developing speed up to 30' per minute, and a width of 28½" (machine sold under the trademark "Ozamatic" by the Ozalid Division of General Aniline & Film Corporation). Each foil in the overlay was completely developed with ammonia and the density corresponding to each step of the silver wedge was measured on the 2 separate foil pieces with a MacBeth-Ansco color densitometer using the green filter. This process gives an approximation to the visual density in each step of the foils. The curves 10 and 11 of the densities of the upper foil (shadow-recording) and the lower foil (highlight-recording) are shown separately in FIG. 9, together with curve 12 of the density of the composite overlay from the two foils. It will be observed that the gamma of the overlay is about 2 in the lower density region and less than 1 in the high density region. This type of foil is clearly unsuited for continuous tone rendition.

(B) A composite layer, using unexposed foil identical with the material used in (A) above, was formed by placing filter No. 5 between the two sensitized foil surfaces, this filter having an effective transmission, measured as described, of 11%. The composite, similar in structure to that of FIG. 1, was exposed at a speed of 1 foot per minute in the aforesaid white print machine and each of the separate foils in the overlay subsequently completely developed with ammonia. The density corresponding to each step of the silver wedge was measured as in Experiment (A). The curve 13 of the density of the layer exposed closest to the light source (shadow detail layer) and the curve 14 of the density of the layer further from the light (highlight detail layer) and the curve 15 of the density of each step of the corresponding two layer composite are shown in FIG. 9. It is immediately apparent that a very substantial improvement in both shadow and highlight reproduction has been effected through the use of the filter layer between the shadow-recording and the highlight-recording layers. The inflection in the sensitometric curve near the optical position of the filter layer in the composite should be noted.

The method described offers the possibility of great variety in the sensitometric responses which may be obtained. An outline of these effects and the general means by which they may be secured are as follows:

(1) A lower overall contrast may be achieved by reducing the overall density of the composite either by uniformly pre-flashing the separate layers at the same flashing speed or by coating the foil at the time of sensitizing with a lower sensitizing load.

(2) For fixed maximum composite density, e.g., the sum of the diazo load in the upper and lower foil being fixed, an increase in tone contrast results if a larger fraction of the total diazo load appears below the filter, e.g., further from the original and the source of illumination. A decrease in tone contrast results if a larger fraction of the diazo load appears above the filter layer.

(3) Increasing the filter transmission raises the average contrast of the density differences recorded predominantly in the diazo layer lying below the filter layer. Decreasing the effective filter transmission lowers the average contrast of the density differences recorded predominantly in the diazo layer lying below the filter layer.

It is evident that by manipulations according to these general rules a very wide variety of sensitometric responses can be achieved in diazotype layers.

EXAMPLE II

A plastic coated (cellulose acetate on face side, polystyrene on back side) heavy weight paper was sensitized with a solution of the following composition and thereafter dried to produce a black developing diazo sensitized paper.

55 cc. water of about 45° C.
25 cc. isopropyl alcohol
5 cc. butyrolactone
1.8 g. citric acid
5 cc. formic acid, 85% aqueous solution
3 cc. phosphoric acid, 75% aqueous solution
2 g. thiourea
1 cc. zinc chloride 5.4 g. resorcinol
.35 g. 2,3-naphthalenediol
1.9 g. 6,7-dihydroxynaphthalene-2-sulfonic acid
1.1 g. 4-N-diethylamino-2-methylbenzenediazonium chloride, zinc chloride double salt
4.3 g. 4-diethylamino-2-ethoxybenzenediazonium chloride, zinc chloride double salt The sensitizing formulation was applied by an applicator roll at a rate of about 30 feet per minute with a 10 second inhibition time, excess solution being removed from the surface by rubber bar doctoring.

The maximum density of a sheet of the foregoing coated material was reduced by a uniform overall exposure (pre-flash) to about 60% of the unflashed value of the maximum density. A sheet of the foil sensitized material of Example I was pre-flashed to a maximum density of about 40% of its unflashed maximum density. A composite was formed, similar in structure to that of FIG. 1, consisting of the pre-flashed paper on top of which was placed filter No. 2 and on top of the filter was placed the pre-flashed foil described above. This composite was exposed as a unit in the aforesaid white print machine at a speed of 3½ feet per minute beneath a continuous tone silver original. The individual parts of the composite were fully developed and the composite reassembled. A faithful and pleasing reproduction of the tones of the continuous tone original was obtained. A composite, similar to the foregoing but without the filter layer, printed beneath the same silver original at a speed of about 10 feet per minute showed badly blocked shadow areas and garish highlights.

In the two foregoing examples, it is clear that no intermingling of the filter chemical and light-sensitive layers has occurred. Through the device of keeping the shadow-recording layer free from light absorber, but introducing a controlled degree of intermingling between the light absorber and diazo sensitizer predominately in the highlight-recording layer, the inflection point in the sensitometric curve can be eliminated and substantially linear sensitometric curves produced.

EXAMPLE III

Referring to FIG. 4, a sensitizing solution for cellulose acetate film base was prepared as follows:

70 cc. acetone
25 cc. methanol
5 cc. 2-methoxyethyl acetate
1.5 g. citric acid
0.75 g. zinc chloride
0.75 g. thiourea
0.5 g. N-o-methoxyphenyl-3-hydroxy-2-napthamide
0.5 g. N-o-tolyl-3-hydroxy-2-napthamide
1.2 g. 4,4'-diresorcinol
3.0 g. p - diethylaminobenzenediazonium chloride, zinc chloride salt 100 cc. of the foregoing solution was diluted with 200 cc. of a solvent mixture containing acetone:methanol:2-methoxyethyl acetate in the ratio 70:25:5 to produce sensitizing solution "X." Sensitizing solution "Y" was prepared by adding 2.5 g. of the U.V. absorber of Example I to 100 cc. of solution "X." A 9 foot strip of triacetate film base, 1a, FIG. 4, about 5 mil. in thickness and 9 inches in width was prepared. One side of this sheet was arbitrarily labeled side "F" and the reverse side, side "E." One end of the 9 foot strip was labeled "L" and the other end labeled "T." The strip so labeled was mounted on a laboratory bead coating device, "F" side out, and commencing 3 feet from the "L" end, side "F" was coated with sensitizing solution "X" at a rate of about 4 feet per minute up to the "T" end to produce layer 2. This procedure yielded a 9 foot strip unsensitized from point "L" and having, between this latter point and "T," sensitized layer 2 on side "F" some 6 feet in length. After thorough drying, the strip was turned over so that side "E" was outside. Commencing at a point 3 feet from the "T" end, side "E" was coated with solution "Y" between the point noted and the "L" end of the strip to produce layer 5. This procedure produced a 9 foot section of film having 3 separate 3 foot long sections—6, 7 and 8 respectively—as follows:

Section 6.—Comprising base 1a coated only with layer 2 from solution "X" only (no absorber present) on side "F."

Section 7.—Comprising base 1a coated on side "F" with layer 2 from solution "X" and on side "E" with layer 5 from solution "Y." Side "E" thus has diazo and light absorber intermingled in the light-sensitive layer.

Section 8.—Comprising base 1a coated only with layer 5 from solution "Y" on side "E." The printing speed of a portion taken from section 6 was found to be 15 feet per minute on the aforesaid white print machine while the printing speed of a portion taken from section 7 was found to be 5 feet per minute on said machine.

The effective transmission of the filter chemical contained in sections 7 and 8 was determined by fully destroying, by prolonged exposure, the diazo in pieces of these sections and then comparing the printing speed of the foil of Example I with and without an overlay of fully exposed sections 7 and 8. The effective transmissions of the two sections were found to be identical, as expected, and equal to 11%. The maximum visual density of section 6 was found by ammonia developing an unexposed piece to be 1.07, that of section 7, 1.04, and that of section 8, 2.14. Consequently, the optical position of the filter is such that almost exactly one half of the diazo lies above the filter layer. A piece of film taken from section 7 was exposed beneath a calibrated silver step wedge and developed on both sides and the density of each step in the resulting print measured with a MacBeth-Ansco color densitometer with the green filter. The sensitometric data thus obtained are plotted in FIG. 10 as curve 16. By the device of superimposing a piece of film from section 6 upon a piece from section 8 and exposing the composite beneath the calibrated silver wedge, developing the separate pieces and measuring the density of the separate layers of the composite in each step, the separate contributions of layer 2 and layer 5 can be determined. The curves 18 and 19 of FIG. 11 depict the data from such an experiment while curve 20 represents the data compiled from the assembled composite. A comparison of FIGS. 10 and 11 shows that the single film and double film experiments yield the same sensitometric curve 20. Finally, in FIG. 10, the sensitometric curve 21 of a layer similar to section 7, except that the U.V. absorber was omitted, is given. A minor numerical adjustment was made in the data to cause the maximum density to coincide with that of the other curves. Comparison of this latter curve with the sensitometric curve of section 7 or sections 6 plus 8 exposed together shows the profound improvement in curve linearity made possible through my invention. The absence of any appreciable inflection point in the curve should be noted.

EXAMPLE IV

Referring to FIG. 5, a high acetyl cellulose acetate film base was bead coated at a rate fo 10 feet per minute with a slution of the fllowing composition and then thoroughly dried:

75 cc. 2-methoxyethyl acetate
15 cc. formic acid 85% aqueous solution
45 cc. 2-methoxyethhanol
12 g. of a mixture of 2,2'-dihydroxy-4,4'-dimethoxy benzophenone and 2,2',4'-trihydroxy-4-methoxybenzophenone The base side containing the U.V. absorber was then coated with a solution having the following composition and dried:

50 cc. 2-methoxyethyl acetate
10 cc. formic acid, 85% aqueous solution 30 cc. 2-methoxyethanol
1 g. sulfosalicyclic acid
0.5 g. thiourea
0.4 g. zinc chloride
0.6 g. 4,4'-diresorcinol
1.0 g. N-o-tolyl-3-hydroxy-2-napthamide
0.9 g. p-diethylaminobenzenediazonium chloride, zinc chloride double salt The opposite side of the film base was sensitized with a formulation identical to that just given except that 1.3 g. of the same diazo compound was used in place of 0.9 g. After thorough drying, the foil was exposed beneath a continuous tone silver original at about 3 feet per minute in an "Ozamatic" machine, and thereafter developed fully on both sides. The resulting print was a pleasing and faithful cold black copy of the silver original.

It will now be apparent to those familiar with the diazotype art that a continuous tone print such as that described in Example II can be made while using my techniques to provide the necessary composite structure obtaining thereby an integral material with a "built-in" and correctly positioned filter and an opaque base.

EXAMPLE V

Referring to FIG. 6, a cast sheet 9 of .75 mil. cellulose acetate, supported temporarily on a glass sheet from which it can be subsequently stripped intact, is sensitized with solution "Y" of Example III in which, however, the diazo concentration is reduced approximately one half in order to maintain the gamma of the print material the same as that of the foil. The coating is then dried to form layer 4 containing the diazo and U.V. absorber. Following the drying operation, sheet 9, still on its support, is pressed into intimate contact with a high finish photograde paper 1b, the surface of which has been dampened by acetone so that lamination to the paper takes place. Drying is very rapid and the thin acetate sheet 9 can be stripped from the glass sheet with a drop of water as a parting fluid. After complete drying, the outer surface of sheet 9 is then sensitized with solution "X" of Example III excepting the diazo concentration is modified as noted in connection with solution "Y." This coating is dried to form layer 2.

Compared to a material otherwise identical except for the U.V. light absorber, the material, constituted as noted, exhibits a very superior rendition to continuous tone subjects.

Since the light absorbing chemical is distributed non-uniformly with respect to the diazo compound(s) in the several layers, it is not surprising that the sensitometric response obtained from one and the same continuous tone foil depends on the orientation of the foil layers with respect to the original. Thus, for normal use, it is desirable to have the side free from light absorber adjacent to the original being copied. However, in order to correct certain types of defects in the original or to accentuate certain portions of the density scale of the original, it may be desirable to reverse the usual order of exposure as indicated in the following example.

EXAMPLE VI

A cellulose triacetate foil was coated with the following composition and dried:

45 cc. acetone
50 cc. methanol
5 cc. γ-butyrolactone
1 g. sulfosalicyclic acid
.5 g. thiourea
.4 g. zinc chloride
1 g. 3-hydroxy-2-naphtho-o-toluidide
1 g. 4,4'-diresorcinol
.4 g. p-diethylaminobenzene diazonium chloride, zinc chloride double salt The opposite side of the foil is next coated with the following solution:

50 cc. acetone
25 cc. methanol
25 cc. 2-methoxyethyl acetate
5 g. U.V. absorber of Example I This U.V. absorber coating was then coated with the following composition and dried:

45 cc. acetone
50 cc. methanol
5 cc. γ-butyrolactone
1 g. sulfosalicyclic acid
.5 g. thiourea
.4 g. zinc chloride
1 g. 3-hydroxy-2-naphthoic-o-toluidide
1 g. 2,2',4,4'-tetrahydroxy diphenyl
.4 g. p-diethylaminobenzene diazonium chloride, zinc chloride double salt FIG. 12 shows the sensitometric curves obtained by exposure (a) through the absorber free side (curve 22) and (b) through the absorber side (curve 23). It is clear that changes are introduced by changing the orientation of the light with respect to the foil during exposure.

EXAMPLE VII

Still further improvements in the sensitometric response can be made by the use of diazotype layers similar to those already described, but of a more complex composite structure such as that shown in FIG. 7. In this case, undue softness in the toe characteristics is removed by the use of a structure comprising an absorber free diazo layer 2, followed by an absorber containing layer 10(a), followed in turn by an absorber free diazo layer 3 and base 1a. The extreme highlight detail will be recorded in layer 3 which, since it is free of light absorber, will exhibit the maximum contrast of which the process is capable in the very low density regions. Normally, however, layers of this or a greater degree of complexity are needed only in the most critical sort of work.

It is to be emphasized that the sensitometric effects reported in the foregoing examples are not confined to the specific sensitizing components and filter chemical used in the examples. As is well known, by a suitable choice of diazo and coupler and solvent balance, diazotype foils in a variety of colors can be prepared. The specific type of materials used for different colors are described in U.S. Patent 2,536,398, Example I (magenta); U.S. Patent 2,494,906, Examples I through III inclusive (cyan), etc. Other colors resulting from specific diazo coupler combinations contemplated herein are:

| Color | Diazo | Coupler |
| --- | --- | --- |
| Red | p-diethylaminobenzenediazonium chloride. | phenylmethylpyrazolone. |
| Blue | p-dimethylaminobenzenediazonium chloride. | 2,3-naphthalenediol. |
| Yellow | 4-ethylamino-3-methylbenzenediazonium chloride. | acetoacetanilide. |
| Green | do | acetoacetanilide and 6,7-dihydroxy-naphthalene-2-sulfonic acid. |
| Orange | 4-diethylamino-2-ethoxybenzenediazonium chloride. | acetoacet-o-toluidide. |
| Sepia | do | 4,4'-diresorcinol. |
| Purple | p-diethylamino-2-methylbenzenediazonium chloride. | 1-naphthol-3-sulfonamide. |

By substituting equivalent amounts of the above materials in any of the formulations given in Examples I through VII inclusive, results similar to those reported in the examples can be obtained.

The proportions of the ingredients to be used in coating depend, of course, on the precise type of response desired. Adjustment of the components to yield the result desired can be determined by applying the rules given heretofore. In general, the effective transmission of the light absorber can be expected to lie in the range 2–70%. Effective transmission values lower than 2% necessarily yield materials having extremely slow printing speeds while values larger than about 70% do not have any great influence on the sensitometric behavior. The effective transmission of the light absorber is the determining influence in establishing its effect and the effective transmission is determined by the spectral absorption coefficient interacting with the light source used for exposure. With reference to the light source, sources having too large a ratio of visible light to ultra-violet light should be avoided since such sources mean that the light absorber for effectiveness must absorb appreciably in the visible and hence the foil itself must necessarily be colored by the absorber. I may say in general that shadow contrast is enhanced by a higher proportion of U.V. light in the source. Highlight contrast is reduced if the light absorber absorbs very intensely in the U.V. region. It is obvious that specific effects can be obtained by modifying the spectral distribution characteristics of the source by the use of filters, etc.

Modifications of the invention will occur to persons skilled in the art. I, therefore, do not intend to be limited in the patent granted except as necessitated by the appended claims.

I claim:

1. Light-sensitive diazotype printing material capable of reproducing continuous tone images, comprising a base, stratified light-sensitive layers thereon each containing a light-sensitive diazo compound and a coupling component, said sensitive layers being positioned so as to be acted on in sequence by the printing light and a U.V. absorber layer located in said printing material at such point that it acts on the printing light after the light has passed through one sensitive layer and not later than its passage through the other sensitive layer, the U.V. absorber in said layer having a strong absorption in the 3660 A. region of the mercury arc and a modest absorption in the region around 4046 A. and selected from the class consisting of 1,3-di-2-thienyl-2-propen-1-one, 2-naphthalenediazocarboxamide, 4,4'-oxalyldiresorcinol, butyl - 3 - umbelliferonecarboxylate, 2,3 - bis - (3,4-methylenodioxyphenyl) - 5 - penylpyrrole, 2,2'-dihydroxy-4,4'-dimethoxy-benzophenone and 2,2'4'-trihydroxy-4-methoxy-benzophenone.

2. Light-sensitive diazotype printing material as defined in claim 1 wherein the base is overcoated with one light-sensitive layer and is undercoated with the other light-sensitive layer, said base being translucent and containing the U.V. absorber.

3. Light-sensitive diazotype printing material as defined in claim 1 wherein the base is overcoated with one light-sensitive layer and is undercoated with the other light-sensitive layer, the base and the undercoating both containing the U.V. absorber.

4. Light-sensitive diazotype printing material as defined in claim 1 wherein the same diazo compound is used in both light-sensitive layers.

5. Light-sensitive diazotype printing material as defined in claim 1 wherein the light-sensitive diazo compound is selected from the class consisting of diazos derived from ortho-and p-phenylene-diamines.

6. Light-sensitive diazotype printing material as defined in claim 1 wherein the layer first struck by the printing light has a greater concentration of diazo than the other light-sensitive layer.

7. Light-sensitive diazotype printing material as defined in claim 1 wherein the U.V. absorber is 2,2'-dihydroxy-4,4'-dimethoxybenzophenone.

8. Light-sensitive diazotype print material as defined in claim 1 wherein the U.V. absorber is a mixture of 2,2'-dihydroxy-4,4'-dimethoxybenzophenone and 2,2',4'-trihydroxy-4-methoxybenzophenone.

9. Light-sensitive diazotype printing material as defined in claim 1 wherein the U.V. absorber is 1,3-di-2-thienyl-2-propen-1-one.

References Cited in the file of this patent

UNITED STATES PATENTS 2,501,874    Peterson              Mar. 28, 1950

OTHER REFERENCES

Anderson et al.: J.A.C.S., volume 76; pages 5144–5146, 1954.